(12) United States Patent
Hamada et al.

(10) Patent No.: US 6,780,538 B2
(45) Date of Patent: Aug. 24, 2004

(54) BATTERY MODULE, AND RECHARGEABLE BATTERY FOR CONSTITUTING THE BATTERY MODULE

(75) Inventors: Shinji Hamada, Toyohashi (JP); Hiroshi Inoue, Toyohashi (JP); Akihiro Taniguchi, Toyohashi (JP); Nobuyasu Morishita, Toyohashi (JP); Noriyuki Fujioka, Kosai (JP); Munehisa Ikoma, Toyohashi (JP); Yoshiaki Ogata, Toyohashi (JP)

(73) Assignees: Matsushita Electric Industrial Co., Ltd., Osaka (JP); Toyota Jidosha Kabushiki Kaisha, Aichi (JP)

(*) Notice: Subject to any disclaimer, the term of this patent is extended or adjusted under 35 U.S.C. 154(b) by 0 days.

(21) Appl. No.: 10/455,345

(22) Filed: Jun. 6, 2003

(65) Prior Publication Data

US 2003/0203278 A1 Oct. 30, 2003

Related U.S. Application Data

(62) Division of application No. 09/614,769, filed on Jul. 12, 2000.

(30) Foreign Application Priority Data

Jul. 22, 1999 (JP) .......................................... 11-207518
Mar. 31, 2000 (JP) ......................................... 2000-98002

(51) Int. Cl.⁷ ............................................... H01M 2/26

(52) U.S. Cl. ...................... 429/157; 429/158; 429/159; 429/160; 429/181

(58) Field of Search ................................ 429/157, 159, 429/158, 160, 181

(56) References Cited

U.S. PATENT DOCUMENTS 3,650,842 A 3/1972 Bougaran (List continued on next page.)

FOREIGN PATENT DOCUMENTS

EP 766327 4/1997

(List continued on next page.)

OTHER PUBLICATIONS

English Language Abstract of JP Appln. No. 10–189055, 7/98.

(List continued on next page.)

*Primary Examiner*—John S. Maples
(74) *Attorney, Agent, or Firm*—Greenblum & Bernstein, P.L.C.

(57) ABSTRACT

A battery module is provided which includes multiple rechargeable batteries coupled together. The battery module includes multiple prismatic cell cases having short lateral walls and long lateral walls arranged side by side. Adjacent short lateral walls are integral with each other. The battery module includes holes extending through the short lateral walls of the cell cases at upper edge portions. The battery module also includes a pair of frame fittings that have base ends and protruding portions in each of the cell cases for connecting two adjacent cell cases. The protruding portions of the pair of frame fittings extend into the through holes in the upper edge portions of the short lateral walls of the cell cases from both sides and are welded together. Positive and negative electrode collector plates in the cell cases are respectively attached to the base ends of the frame fittings. End frame fittings that have base ends and protruding portions for cell cases are located at both outer ends of the rechargeable battery for connecting the cell cases to outside terminals. Connection terminals that have protruding portions are connected to the end frame fittings at both outer ends of the rechargeable battery.

2 Claims, 8 Drawing Sheets

U.S. PATENT DOCUMENTS

| | | | |
|---|---|---|---|
| 3,981,742 A | 9/1976 | Yonezu et al. |
| 4,029,855 A | 6/1977 | Dougherty et al. |
| 4,138,533 A | 2/1979 | Steig |
| 4,267,243 A | 5/1981 | Park et al. |
| 4,480,018 A | 10/1984 | De Bellis et al. |
| 4,603,093 A | 7/1986 | Edwards et al. |
| 5,766,798 A | 6/1998 | Bechtold et al. |
| 5,871,861 A | 2/1999 | Hirokou et al. |
| 6,304,057 B1 | 10/2001 | Hamada et al. |
| 6,340,311 B1 | 1/2002 | Hamada et al. |
| 6,551,741 B1 | 4/2003 | Hamada et al. |
| 6,555,264 B1 | 4/2003 | Hamada et al. |

FOREIGN PATENT DOCUMENTS

| | | |
|---|---|---|
| EP | 1059680 | 12/2000 |
| FR | 2370368 | 6/1978 |
| GB | 1590947 | 6/1981 |
| JP | 5-159769 | 6/1993 |
| JP | 07245092 | 9/1995 |
| JP | 10189055 | 7/1998 |

OTHER PUBLICATIONS

English Language Abstract of JP Appln. No. 07–245092, 9/95.

English Language Abstracts of Japanese vol. 017, No. 549, published Oct. 4, 1993.

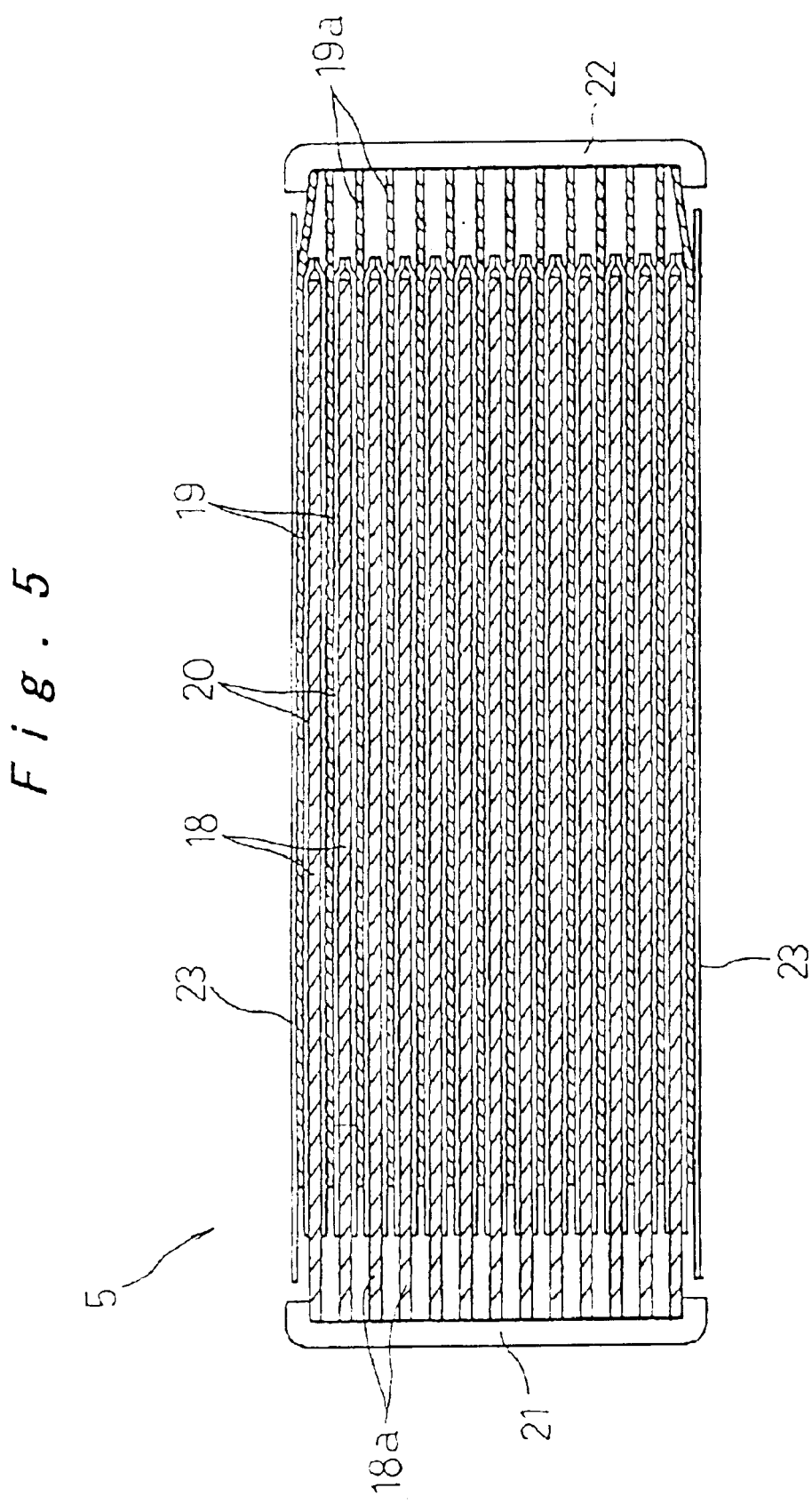

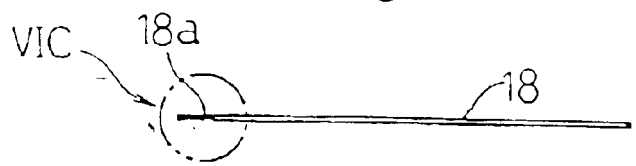
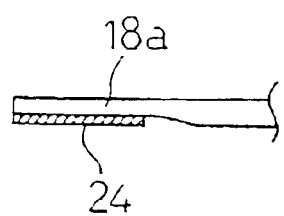
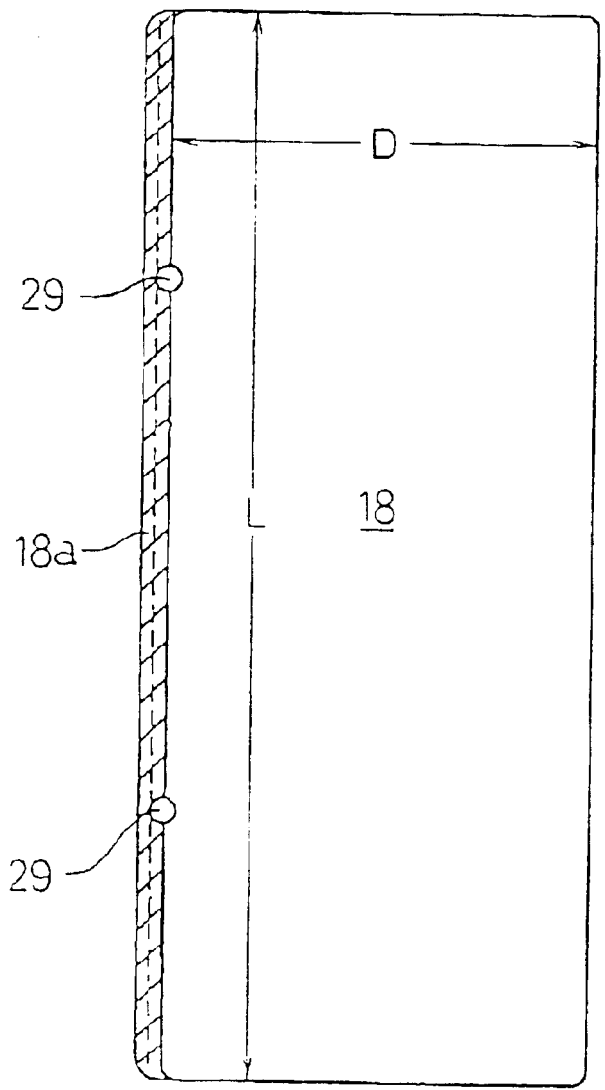

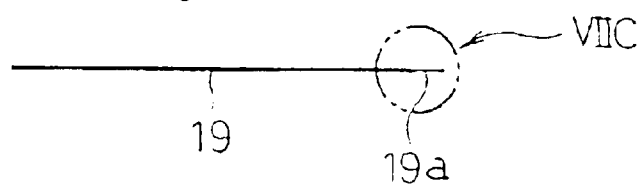
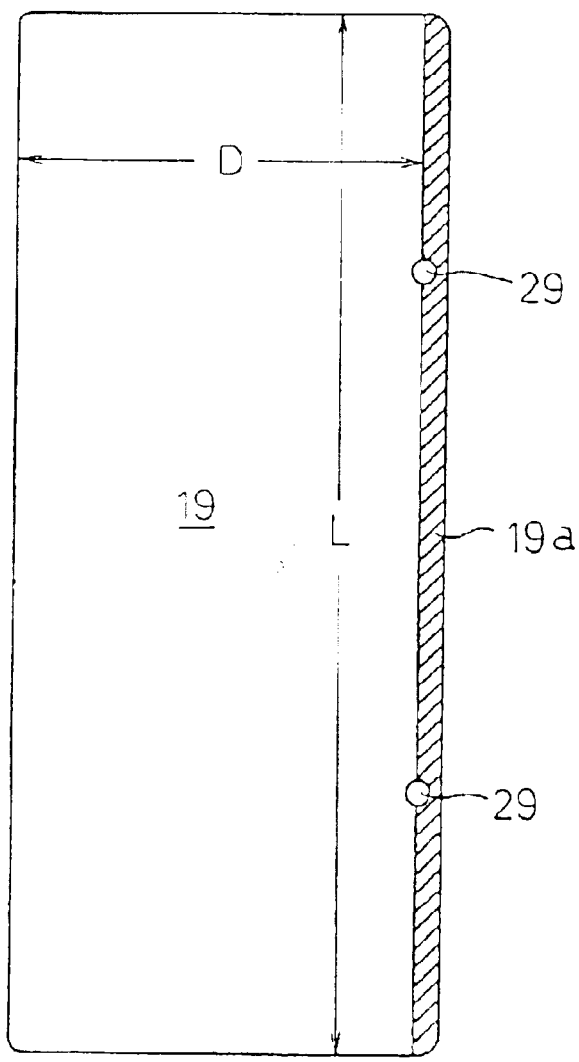

BATTERY MODULE, AND RECHARGEABLE BATTERY FOR CONSTITUTING THE BATTERY MODULE

The present application is a divisional of pending U.S. patent application Ser. No. 09/614,769, filed Jul. 12, 2000, entitled "Battery Module, and Rechargeable Battery for Constituting the Battery Module", the disclosure of which is expressly incorporated herein by reference in its entirety.

BACKGROUND OF THE INVENTION

1. Field of the Invention

The present invention relates to a battery module, and in particular to a rechargeable battery for constituting the battery module in which the internal battery resistance can be made small and the battery output can be increased.

2. Description of Related Art

FIG. 10 shows a conventional battery module made by connecting a plurality of rechargeable batteries and coupling them together as one so as to obtain the necessary power. In this battery module, a plurality of cells 41 (41a to 41j) made of sealed alkaline rechargeable batteries as shown in FIG. 11 are arranged side by side, with the long lateral walls of the battery cases 42 adjacent each other. End plates 52 are arranged against the outside of the cells 41a and 41j at both ends, and the two end plates 52 and 52 are bound together with binding bands 53 so as to couple the cells together as one piece.

For the cells 41, an electrode plate group 47, comprising positive electrode plates and negative electrode plates layered with intervening separators, thus constituting elements for electromotive force, is accommodated in a battery case 42 together with a liquid electrolyte, and the open end of the battery case 42 is closed with a lid 46 provided with a safety vent 45. From the upper end at one side of the positive electrode plates forming the electrode plate group 47, leads 49 extend upward and are connected to a positive electrode terminal 43 above them, and similarly, from the upper end of the other side of the negative electrode plates, leads 49 extend upward and are connected to an negative electrode terminal 44 above them. The positive electrode terminal 43 and the negative electrode terminal 44 are attached to the lid 46.

The positive electrode terminals 43 and negative electrode terminals 44 of coupled neighboring cells 41 are connected by connection plates 51, thereby connecting all cells 41 in series. When the battery cases 42 are coupled, ribs 48, which protrude vertically from the long lateral walls of the battery cases 42, are abutted against each other, forming coolant passages running in the vertical direction along the long lateral walls of the battery cases 42 in the space between ribs 48. The cells 41a to 41j are cooled by flowing air through these coolant passages.

However, with the configuration for the cells 41 of this conventional battery module, leads 49 extend from a portion at the upper end on one side of the electrodes and are connected to the electrode terminals 43 and 44, and consequently, there were the problems that the internal resistance of the battery was large, because the average distance from the surface of the electrodes to the collector portions of the leads 49 was long, and that the power output was low, because the utilization rate of the electrode active material was low.

Moreover, because the terminals 43 and 44 protruding to the outside of the lid 46 are connected by connection plates 51, it is necessary to provide space for this connection at the upper end of the battery cases 42. Furthermore, since the connection portions are exposed, there is the problem that the space for installing this battery module cannot be made compact.

Moreover, in the portions where electrode pillars of the electrode terminals 43 and 44 extend through the lid 46, O-rings for providing a seal are usually placed only on the inner side of the lid 46, and there was the danger that electrolyte may leak during use of the battery.

SUMMARY OF THE INVENTION

In view of these problems of the prior art, it is an object of the present invention to provide a rechargeable battery, of which internal battery resistance is small and of which battery output can be improved. A further object of the present invention is to provide a battery module, of which installation space can be made, and in which there is no danger of electrolyte leakage.

To achieve the above object, the present invention provides a rechargeable battery, comprising:
- a prismatic cell case having short lateral walls and long lateral walls; and
- a group of electrodes accommodated inside the cell case, the group of electrodes including a plurality of positive and negative electrode plates arranged alternately and substantially in parallel to the long lateral walls of the cell case with an intervening separator therebetween;
- wherein lateral edges of the positive electrode plates protrude beyond the negative electrode plates on one side, and lateral edges of the negative electrode plates protrude beyond the group of positive electrode plates on the opposite side, the protruding portions forming lead portions.

Since the lateral portions on one side of the electrode plates serve as lead portions, the average distance from the surfaces of the electrode plates to the collector portions can be made short, the internal battery resistance can be made small, and the utilization rate of the electrode active material becomes large, whereby the power output of the battery can be increased.

The lateral edge portions of the negative electrode plate and positive electrode plate lead portions of the group of electrodes are attached to respective collector plates, and the group of electrodes is thus held by the collector plates. Therefore, the group of electrodes can be held with a compact configuration, and the surface area of the regions for generating an electromotive force can be made large, whereby the battery capacity can be increased.

The collector plates are provided with curved portions at both ends thereof for clamping the group of electrodes. Thereby, the electrodes do not spread and extend toward the outside of the collector plates when the group of electrodes are attached to the collector plates, and the electrodes can be fixed reliably to the collector plates.

By setting D<L ≦4D, where L is the length of a side of the lead portions of the electrodes and D is the length of a side in a direction perpendicular thereto, the average distance from the surfaces of the electrode plates to the collector portions can be made even shorter, and the above-noted effects can be enhanced. If D≧L, the ratio of the space for connecting the cells, that is formed between the upper edge of the electrode plate group and the upper wall of the cell case, against the volume of the electrode plate groups becomes large. As the proportion of the dead space increases, the battery capacity is compromised accordingly, but this problem can be solved when L and D are set as noted above. On the other hand, if L>4D, the aspect ratio (vertical/horizontal) becomes too large, which leads to problems with regard to other structural conditions, such as maintaining the strength of the collector plates or manufacturing of the cell cases. Moreover, if L>4D, there is the problem that temperature variations are large between the two ends of the electrode plate groups in the flow direction of the coolant when the outer walls of the cell case are cooled by letting a coolant flow in the longitudinal direction along the lead portions of the electrode plate groups, but this problem does not occur when L and D are set as noted above.

In the cell case in which a group of electrodes is accommodated, which is made of electrode plates whose dimensions are set to D<L≦4D as noted above, by setting d<l<4d, where l is the length of the long lateral walls of the cell case in the direction parallel to the lead portions of the electrodes, and d is the width of the long lateral walls in the direction perpendicular thereto, the proportion of the dead space is optimized and the battery capacity is increased. Moreover, the temperature variations between the upper portion and the lower portion of the electrode plates can be reduced, when the cell case is cooled by letting the coolant flow in the vertical direction of the long lateral walls of the cell cases.

As mentioned above, the lateral edge portions of the group of positive electrode plates protrude beyond the group of negative electrode plates on one side, and the lateral edge portions of the group of negative electrode plates protrude beyond the group of positive electrode plates on the opposite side form the lead portions. Therefore, a single, belt-like separator can be arranged in a zigzag fashion between the positive electrode plates and the negative electrode plates. In this way, the separator can be arranged easier between the electrode plates than by covering the electrode plates with bag-shaped separators.

The rechargeable battery according to the present invention can be constructed such that:

a plurality of cell cases are coupled together as one piece with the short lateral walls of the cell cases being mutually integrated, thereby constituting an integral battery case;

upper open ends of the cell cases are closed by an integral lid member; and the collector plates in adjacent cell cases are connected to each other via a connection fitting that extends through the short lateral walls between the adjacent cell cases.

Thereby, the neighboring cells can be connected to each other inside the integral battery case, and the space for setting up the rechargeable battery can be made compact.

Furthermore, through holes are formed in the short lateral walls between two adjacent cell cases at an edge portion; and the connection fitting comprises a pair of frame fittings, each frame fitting having a base end and a protruding portion that is inserted into the through holes, the distal ends of the protruding portions being welded together, and the collector plates being attached to the base ends of the frame fittings. Thereby, the collector plates can be connected easily by welding with a pair of frame fittings.

According to the present invention, a battery module can be constituted by coupling a plurality of rechargeable batteries together, each of the rechargeable batteries, accommodating therein a group of electrodes and a liquid electrolyte, wherein:

a plurality of prismatic cell cases having short lateral walls and long lateral walls are arranged side by side, with adjacent short lateral walls being integral with each other;

the group of electrodes inside a cell case including a positive electrode collector plate and a negative electrode collector plate arranged at lateral opposite ends of the cell case in the direction of the long lateral walls thereof;

through holes are formed in the short lateral walls of the cell cases at upper edge portions thereof;

a pair of frame fittings comprising base ends and protruding portions are provided for each of the cell cases for connecting two adjacent cell cases, the protruding portions of the pair of frame fittings being inserted into the through holes formed in the upper edge portions of the short lateral walls of the cell cases from both sides and welded together, and the positive and negative electrode collector plates in the cell cases being respectively attached to the base ends of the frame fittings;

end frame fittings having base ends and protruding portions are provided for cell cases located at both outer ends of the rechargeable battery for connecting the cell cases at both outer ends of the rechargeable battery to outside terminals; and connection terminals having protruding portions are connected to the end frame fittings of the cell cases at both outer ends of the rechargeable battery.

Thereby, the connection between the cell cases and the outside of the cell cases can be carried out easily with a compact configuration.

Moreover, a sealing material is provided around the protruding portions of the frame fittings and the connection terminals, so as to provide a seal between the two adjacent cell cases, whereby both sides of the connection configuration can be sealed double, and leakage of liquid electrolyte during use of the battery can be prevented.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 5 is a cross-sectional view taken in the direction of the arrows along the line V—V in FIG. 4;

FIG. 6A is a front view,

FIG. 6B is a top plan view, and

FIG. 6C is an enlargement of VIC in FIG. 6B, showing the positive electrode plate in the same embodiment;

FIG. 7A is a front view,

FIG. 7B is a top plan view, and

FIG. 7C is an enlargement of VIC in FIG. 7B, showing the negative electrode plate in the same embodiment;

DESCRIPTION OF PREFERRED EMBODIMENTS

Preferred embodiments of a battery module according to the present invention will be hereinafter described with reference to FIGS. 1 to 8.

Figure 1:
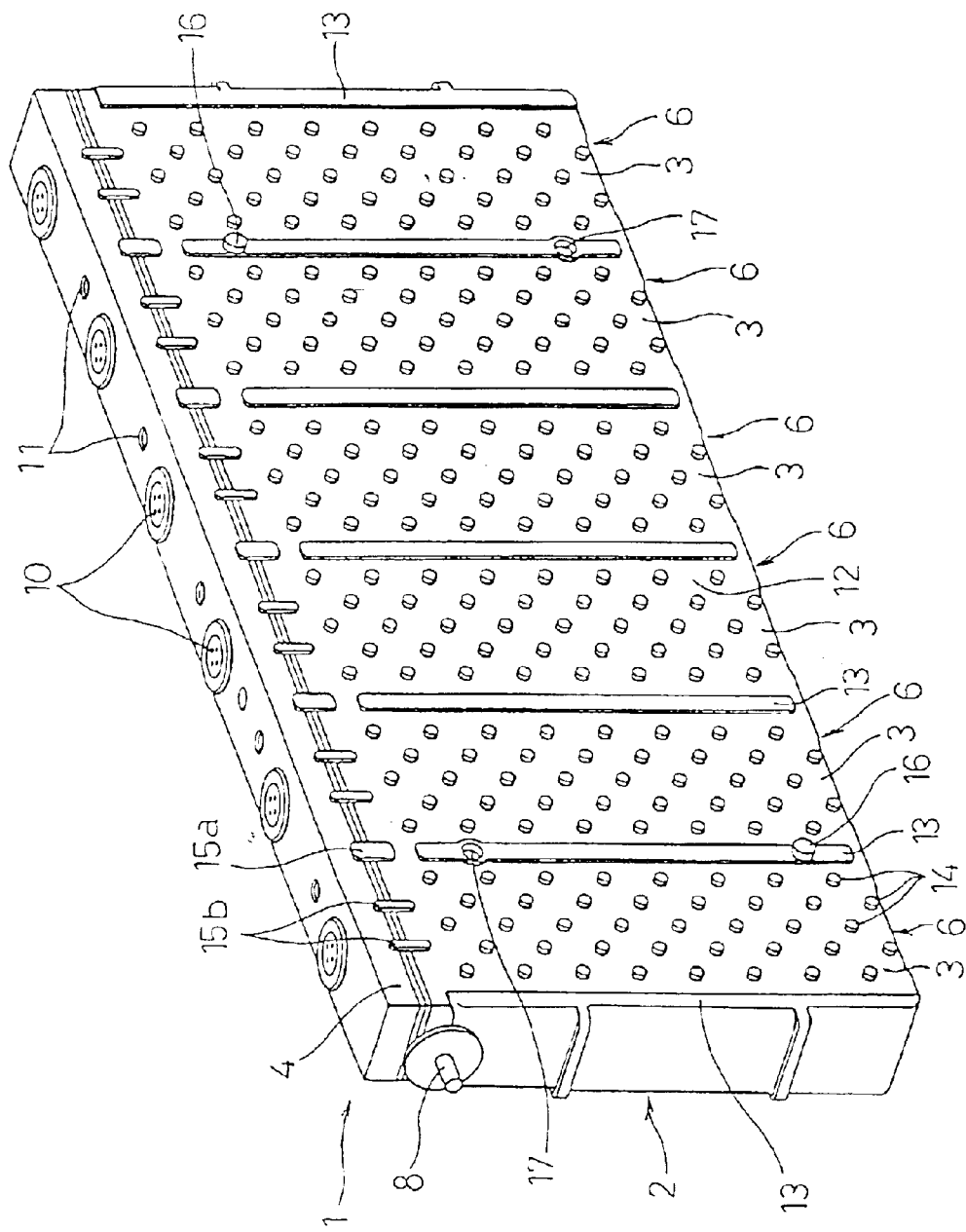
FIG. 1 is an external perspective view of a battery module according to one embodiment of the present invention.
Figure 2:
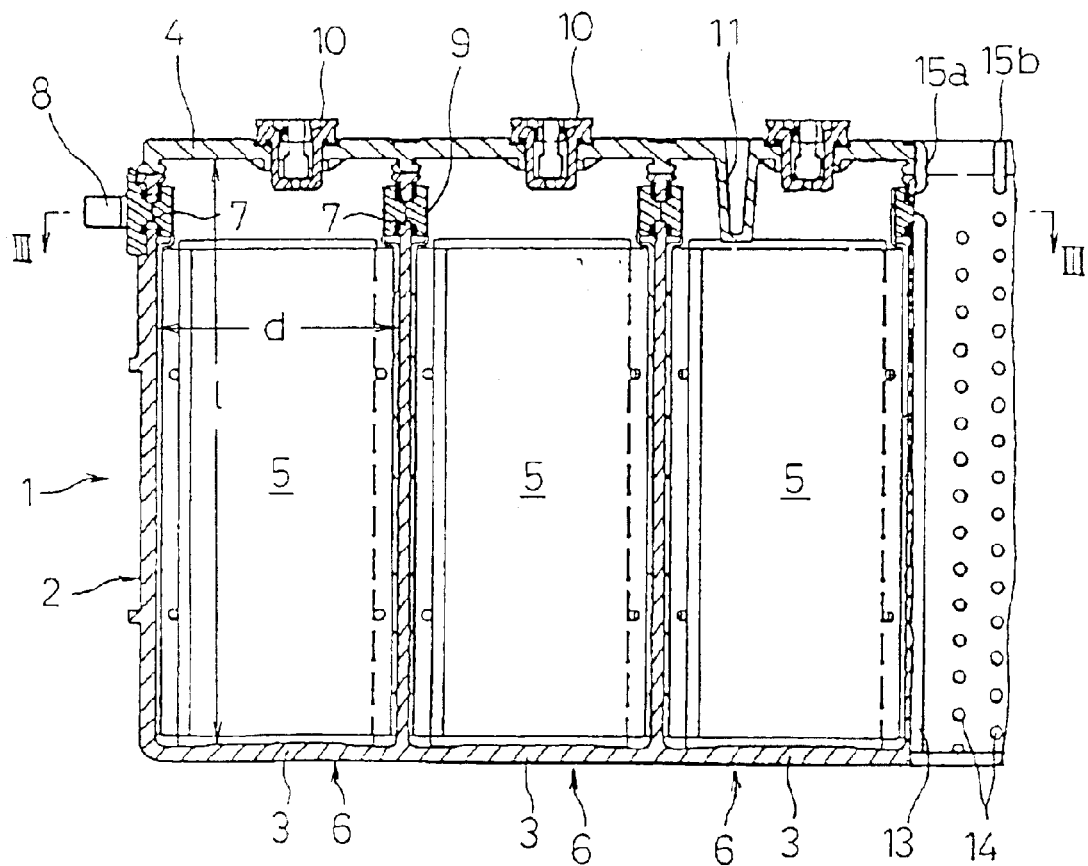
FIG. 2 is a partial vertical lateral cross-sectional view of the same.
Figure 3:
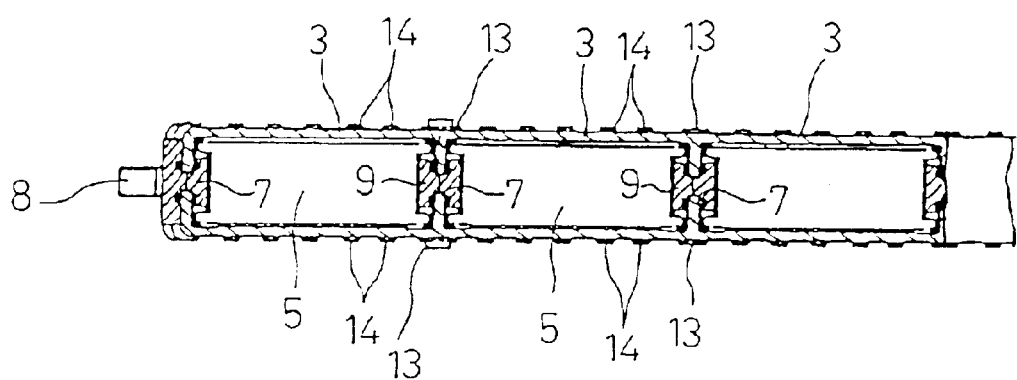
FIG. 3 is a cross-sectional view taken in the direction of the arrows along the line III—III in FIG. 2.

The battery module of this embodiment is a nickel metal hydride battery, which is suitable for use as a drive power source for an electric vehicle. As shown in FIGS. 1 to 3, the battery module 1 is made up of a plurality of (six in the example shown in the drawing) cells 6, arranged in a row. Cell cases 3 of each of the cells 6, which are formed in a prismatic fashion with short lateral walls, long lateral walls, and open top ends, are mutually integrated on their short lateral walls, thereby constituting an integral battery case 2. The upper open ends of the cell cases 3 are closed all together by an integral lid member 4.

Each of the battery cases 3 constitutes a cell 6, accommodating therein electrode plate groups 5 together with electrolyte. An electrode plate group 5 comprises a large number of positive electrode plates and negative electrode plates arranged parallel to the long lateral walls of the cell cases 3 and layered in the direction of the short lateral walls of the cell cases 3, with intervening separators therebetween. The construction inside the battery case will be described later in more detail.

Connection holes 7 are formed at the upper edge portions of the outer short lateral walls of the cell cases 3 at the two ends of the integral battery case 2 and between each two cell cases 3. Positive and negative connection terminals 8 are respectively mounted to the connection holes 7 at the outer short lateral walls of the two outer cell cases 3, and connection fittings 9 for serially connecting two adjacent cells 6 are mounted to the connection holes 7 in the intermediate short lateral walls between each two cell cases 3. In addition, the lid member 4 is provided with one safety vent 10 for each of the cell case 3, so as to release pressure when the internal pressure in the cell cases 3 has exceeded a certain value. Moreover, a sensor mounting hole 11 for mounting a temperature detection sensor for detecting the temperature of the cells 6 is formed at suitable cells 6 or for each cell 6.

The long lateral walls of six cells 6 together form an integral side wall 12 of the integral battery case 2. On this side wall 12 of the integral battery case 2, protruding ribs 13 that extend vertically are provided at positions corresponding to the lateral edges of two adjacent cell cases 3. Further, a large number of relatively small circular protrusions 14 are formed at suitable intervals in matrix fashion between each two ribs 13. The ribs 13 and the protrusions 14 have the same height. Furthermore, coupling ribs 15a and 15b having the same height as the ribs 13 and the protrusions 14 are formed on the side walls of the upper edge of the cell cases 3 and the side walls of the lid member 4, such as to bridge across the side walls of the cell cases 3 and the lid member 4, at positions corresponding to an extension of the ribs 13 and the protrusions 14. A plurality of protrusions 16 and indentations 17, for positioning and fitting together integral battery cases 2 when their side walls 12 are abutted on each other, are arranged at an upper portion and a lower portion of the outer surface of the two ribs 13 near both ends of the side wall 12 of the integral battery case 2. When a plurality of integral battery cases 2 are arranged in a row in parallel to constitute a battery module, the ribs 13, the protrusions 14 and the coupling ribs 15a and 15b form coolant passages for cooling the cell cases 3 effectively and uniformly.

Figure 4:
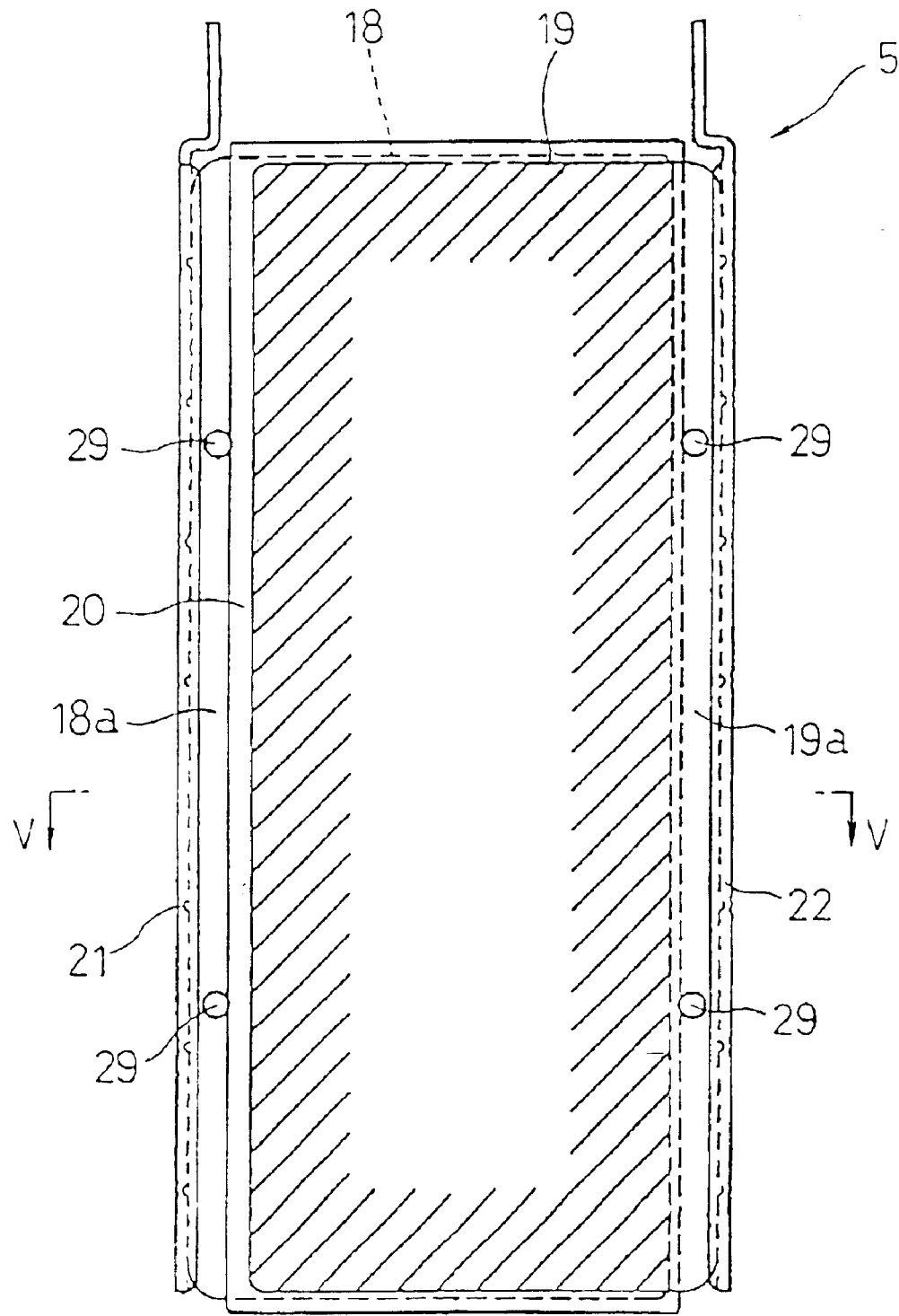
FIG. 4 is a front view of an electrode plate group of the same embodiment.

The aforementioned electrode plate groups 5 are explained in detail with reference to FIGS. 4 to 7. In FIGS. 4 and 5, a plurality of positive electrode plates 18 and negative electrode plates 19 are arranged alternately, and the positive electrode plates 18 are covered with separators 20 in the form of a bag having an opening on one side. The positive plates 18 and the negative plates 19 are stacked upon one another with separators 20 therebetween, thereby constituting the electrode plate group 5. In FIG. 4, the region where the positive electrode plates 18 and the negative electrode plates 19 oppose each other with the intervening separators 20 and generate electric power is indicated by oblique lines. The lateral edges of the group of positive electrode plates 18 protrude beyond the group of negative electrode plates 19 on one side, and the lateral edges of the group of negative electrode plates 19 protrude beyond the group of positive electrode plates 18 on the opposite side, and these protruding lateral portions form the lead portions 18a and 19a, to the lateral ends of which collector plates 21 and 22 are welded, respectively. The outer edges of the collector plates 21 and 22 are bent toward the inside as shown in FIG. 5, in order to restrict the dimensions of the electrode plates 18, 19. The collector plates 21, 22 are welded to the electrode plates 18, 19, so that the, electrode plates 18, 19 do not spread outwards as pressure is applied thereto. Numeral 23 denotes external separators arranged at the outer faces of the electrode plate group 5 between the collector plates 21 and 22.

The positive electrode plates 18 are made of Ni foamed metal. As shown in FIGS. 6A–6C, the lead portion 18a is constructed by compressing one lateral edge of the plate of foamed metal and attaching a lead plate 24 on one surface of the lead portion 18a by ultrasonic welding or seam welding. The negative electrode plates 19 shown in FIG. 7 are made of Ni punched metal coated with an active material except for lead portions 19a. "L" denotes the length of a side of the positive electrode plate 18 and the negative electrode plate 19 where the lead portions 18a and 19a are provided, and "D" denotes the length of the side in a direction perpendicular thereto. The positive and negative electrode plates 18, 19 are configured so that "L" is larger than "D", but not larger than four times "D".

Numeral 29 denotes pairs of positioning holes formed in the lead portions 18a and 19a at a suitable distance from the top and the bottom thereof. By inserting positioning pins into these positioning holes 29 and by applying pressure on the lateral ends of the lead portions 18a and 19a, these lateral ends of the lead portions 18a and 19a are aligned and welded reliably and evenly to the collector plates 21 and 22.

Figure 8:
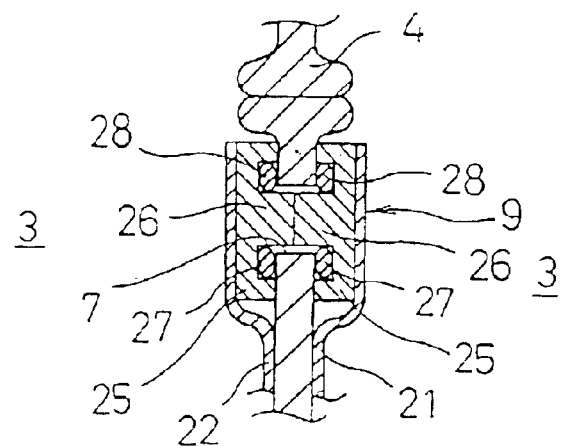
FIG. 8 is a vertical cross-sectional view showing the configuration of a portion connecting two cells in the same embodiment.

FIG. 8 shows the connection fitting 9 for serially connecting the cells 6. The connection fitting 9 comprises a pair of frame fittings 25, to the base ends of which the upper ends of the collector plates 21 and 22 of two neighboring cells 6 are welded, respectively. The cells 6 are connected by inserting from both sides protruding portions 26 projecting from an axial portion of the frame fittings 25 into the connection hole 7 formed in the short lateral walls of the cell cases 3, and abutting their leading faces against each other and welding them together. The bonding of the upper ends of the collector plates 21 and 22 to the base ends of the frame fittings 25 and the welding of the leading faces of the protruding portions 26 are performed by resistance welding all together after they have been assembled. Annular grooves 27 are formed around the protruding portions 26 of the frame fittings 25, and the connection hole 7 is sealed double with O-rings 28 mounted in these annular grooves 27.

In the battery module 1 of the present invention, as described above, the integral battery case 2 is constituted by mutually connecting a plurality of prismatic cell cases 3, abutted on their short side walls. The open ends of the cell cases 3 are closed by the integrated lid member 4, and the collector plates 21, 22 of the electrode plate groups 5 in adjacent cells 6 are connected via the connection fittings 9, that pass through the connection holes 7 formed in the upper edges of the short side walls of each cell case 3. Therefore, neighboring cells 6 can be connected inside the integral battery case 2. Since the connection configuration is not exposed to the outside, the installation space for the battery module 1 can be made compact.

The connection fittings 9 are made of pairs of frame fittings 25 having protruding portions 26, which are inserted into the connection holes 7 from both sides and whose leading ends are welded together, and to whose base ends the collector plates 21 and 22 are attached, so that the electrode plate groups 5, i.e., the cells 6 of neighboring cell cases 3 can easily be connected in series by welding the frame fittings 25. Also, by arranging connection terminals 8 having similar protruding portions 26 and frame fittings 25 on the outer short lateral walls of the two cell cases 3 at opposite ends and by welding the leading ends of their protruding portions 26, 26 together, the connection of the cell cases 3 on either end with an external terminal can be performed with a compact configuration and in a simple manner.

Moreover, thanks to the O-rings 28 for sealing the cell cases 3 provided around the protruding portions 26 of the frame fittings 25 and the connection terminals 8, both sides of the short lateral walls of adjacent cell cases 3 are sealed double and leakage of liquid during use can be prevented reliably.

In the electrode plate groups 5 of the cells 6, the lateral edge portions of the group of positive electrode plates 18 protrude beyond the group of negative electrode plates 19 on one side, and the lateral edge portions of the group of negative electrode plates 19 protrude beyond the group of positive electrode plates 18 on the opposite side, and these protruding lateral portions form the lead portions 18$a$ and 19$a$, to which collector plates 21 and 22 are welded over their entire length. Therefore, the average distance from the surfaces of the electrodes 18 and 19 to the collector plates 21 and 22 can be made short, and as a result, the internal battery resistance can be made small and the utilization rate of the electrode active material becomes large, which increases the battery output. In FIG. 4, the collector plates 21 and 22 are attached to the lead portions 18$a$ and 19$a$ over their entire length, but substantially the same effect can be attained if the collector plates 21 and 22 are attached to the lead portions 18$a$ and 19$a$ over at least half the length of the lead portions 18$a$ and 19$a$.

Moreover, the groups of electrode plates 18 and 19 are held in a simple construction by attaching the lateral edge portions of the lead portions 18$a$ and 19$a$ of the electrode plates 18 and 19 to the collector plates 21 and 22, whereby the surface area of the regions for generating an electromotive force becomes large, and the battery capacity can be increased.

The length L of a side of the electrode plates 18, 19 where the lead portions 18$a$, 19$a$ are provided, and the length D of the side orthogonal to L are set $D<L\leq 4D$, so that the average distance from the entire surfaces of the electrode plates to the collector plates can be made even shorter. If $D\geq L$, the ratio of the space for connecting the cells 6, that is formed between the upper ends of the electrode plate groups 5 and the upper wall of the lid member 4 (dead space), against the volume of the electrode plate groups 5 (space where electromotive force is generated) becomes large. As the dead space increases, the battery capacity is compromised accordingly, but this problem can be solved with the above-described configuration.

On the other hand, if $L>4D$, the aspect ratio (vertical/horizontal) becomes too large, which leads to the problem with regard to other structural conditions, such as maintaining the strength of the collector plates 21 and 22 or manufacture of the cell cases 3. Furthermore, if $L>4D$, large temperature variations would occur between the lower end and the upper end of the electrode plate groups 5, when a plurality of integral battery cases 2 are arranged side by side and their outer walls are cooled by flowing a coolant in the vertical direction perpendicular to the direction in which the cell cases 3 are arranged, that is, in the longitudinal direction along the lead portions of the electrode plate groups 5. Such problem can be prevented by setting "L" and "D" are set as described above.

Moreover, if the length l of the long lateral walls of cell cases 3 parallel to the lead portions 18$a$, 19$a$ of the electrode plates 18, 19 and the length d of the short lateral walls of the cell cases 3 as indicated in FIG. 2 are set $d<l\leq 4d$, the proportion of the above mentioned dead space can be optimized and the battery capacity can be increased. Also, the temperature variation between the upper end and the lower end of the electrode plates can be reduced, when the cell cases 3 are cooled by letting the coolant flow in the vertical direction of the long lateral walls of the cell cases 3.

Figure 9:
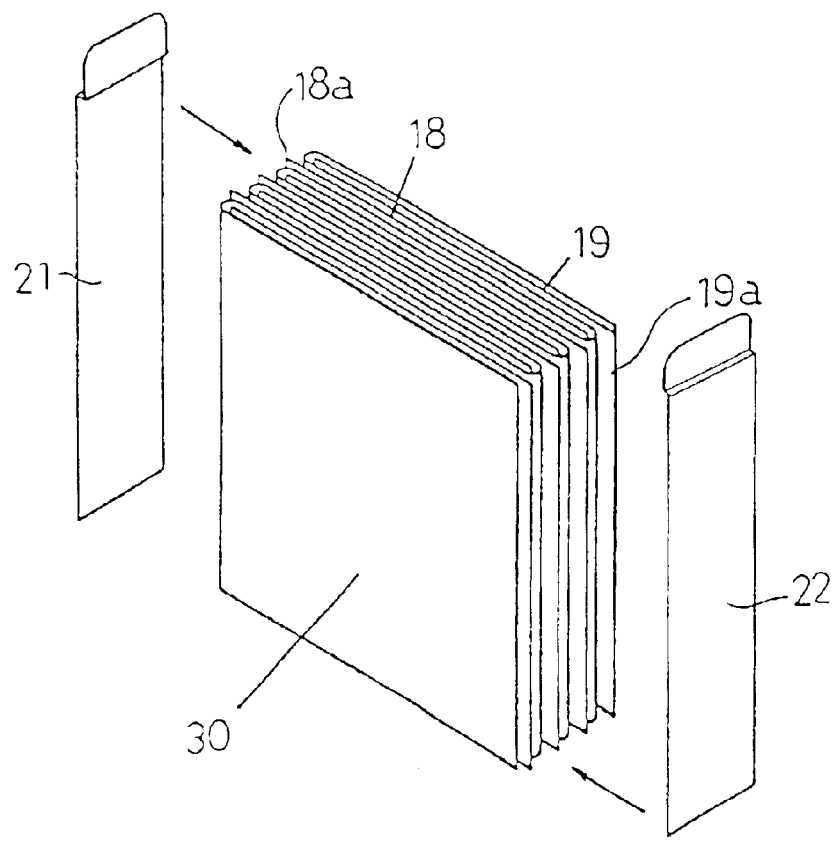
FIG. 9 is an exploded perspective view of an electrode plate group in another embodiment of the present invention.
Figure 10:
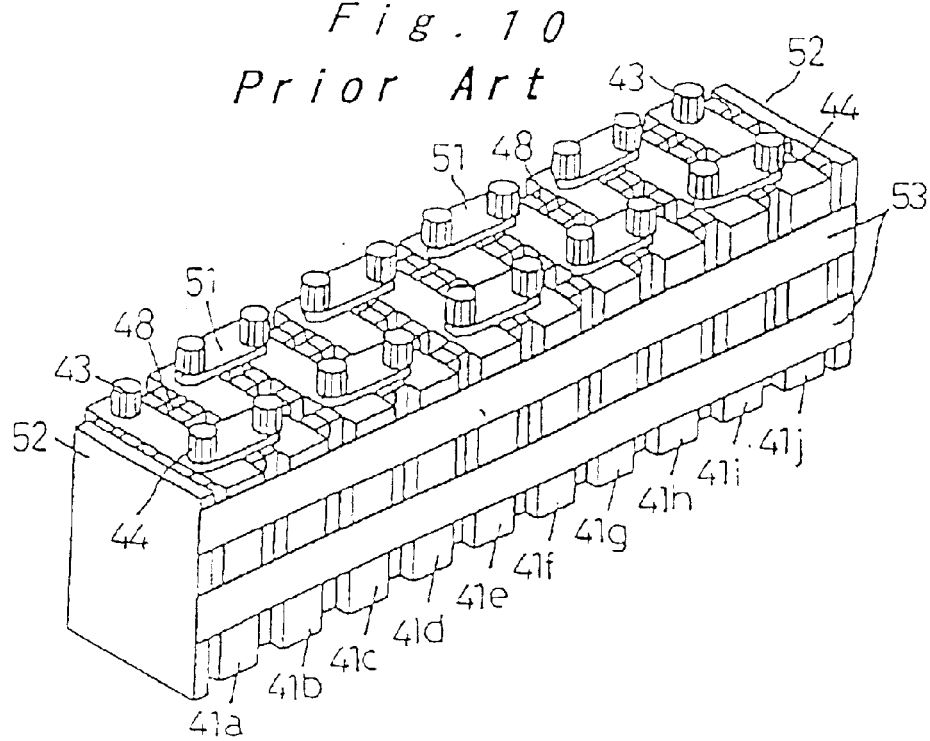
FIG. 10 is an external perspective view of a conventional battery module.
Figure 11:
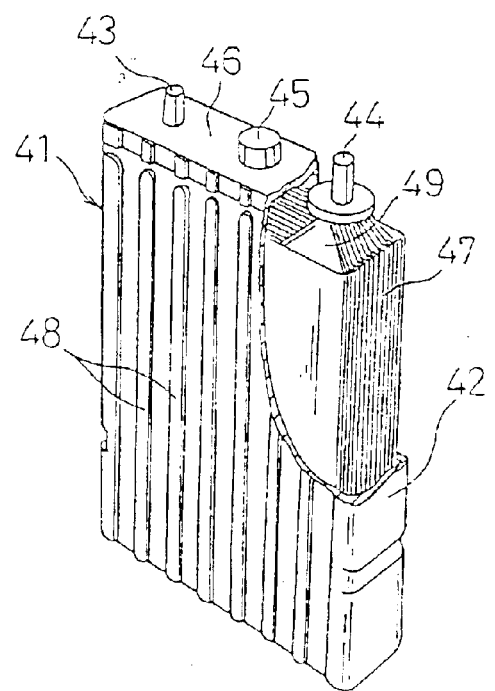
FIG. 11 is a partially cutaway perspective view of a cell of the same conventional example.

Next, another embodiment of a rechargeable battery in accordance with the present invention will be described with reference to the FIG. 9. In the aforementioned embodiment, the positive electrode plates 18 are covered by bag-shaped separators 20, so that the separators 20 are provided between the positive electrode plates 18 and the negative electrode plates 19. Since the lateral edge portions of the group of positive electrode plates 18 protrude beyond the group of negative electrode plates 19 on one side, and the lateral edge portions of the group of negative electrode plates 19 protrude beyond the group of positive electrode plates 18 on the opposite side, and these protruding lateral edge portions form the lead portions 18$a$ and 19$a$, the separator can be arranged in a zigzag fashion between the positive electrode plates 18 and the negative electrode plates 19 as shown in FIG. 9. This embodiment employs such meandering arrangement of the separator 30. In this way, the separator can be arranged easier between the electrode plates 18 and 19 than by covering each of the electrode plates with the bag-shaped separators 20.

As has been explained above, in the rechargeable battery in accordance with the present invention, the lateral edge portions of the group of positive electrode plates protrude beyond the group of negative electrode plates on one side, and the lateral edge portions of the group of negative electrode plates protrude beyond the group of positive electrode plates on the opposite side, and these protruding lateral edge portions form the lead portions. Thus one lateral edge of each electrode plate serves as a lead portion, and thereby the average distance from the surfaces of the electrodes to the collector portions can be made short. Accordingly, the internal battery resistance can be made small and the utilization rate of the electrode active material becomes large, whereby the power output of the battery is increased.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery module with a plurality of rechargeable batteries coupled together, each of the rechargeable batteries configured for accommodating therein a liquid electrolyte and a group of electrodes comprising a group of positive electrode plates and a group of negative electrode plates, the battery module comprising:

a plurality of prismatic cell cases having short lateral walls and long lateral walls arranged side by side with adjacent short lateral walls being integral with each other, and upper open ends of the plurality of prismatic cell cases being integrally closed with a single lid member;

the group of electrodes inside a cell case including a positive electrode collector plate and a negative electrode collector plate arranged at laterally opposite ends of each of the group of positive electrode plates and the group of negative electrode plates respectively;

holes extending through the short lateral walls of the cell cases at upper edge portions thereof;

a pair of frame fittings comprising base ends and protruding portions in each of the cell cases for connecting two adjacent cell cases, the protruding portions of the pair of frame fittings extending into the through holes in the upper edge portions of the short lateral walls of the cell cases from both sides and being welded together, and the positive and negative electrode collector plates in the cell cases being respectively attached to the base ends of the frame fittings;

end frame fittings having base ends and protruding portions for cell cases located at both outer ends of the rechargeable battery for connecting the cell cases at both outer ends of the rechargeable battery to outside terminals; and connection terminals having protruding portions connected to the end frame fittings of the cell cases at both outer ends of the rechargeable battery.

2. The battery module of claim 1, further comprising a sealing material around the protruding portions of the frame fittings and the connection terminals, so as to provide a seal between the two adjacent cell cases.

* * * * *